Figure 4:
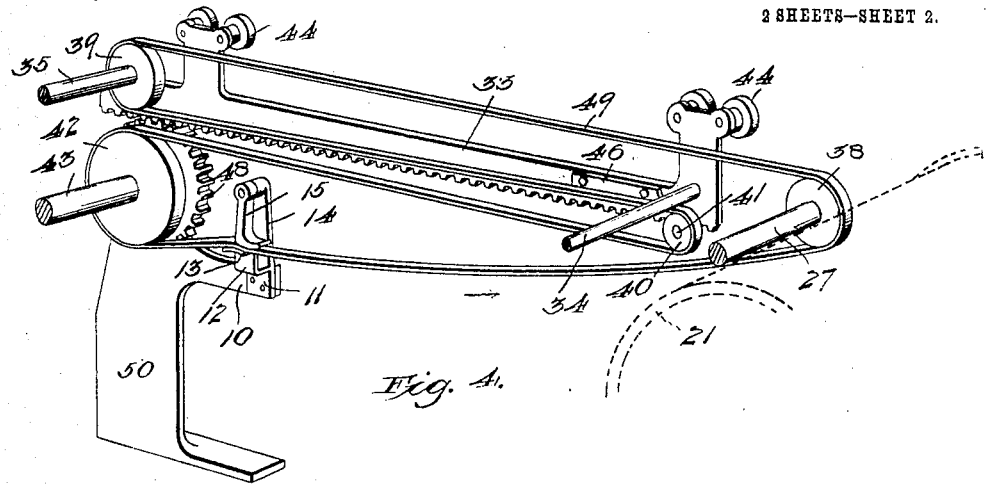

J. HUMPHRY.
BELT DELIVERY CLUTCH FOR PRINTING PRESSES.
APPLICATION FILED MAY 1, 1906.
916,318.
Patented Mar. 23, 1909.
2 SHEETS—SHEET 1.
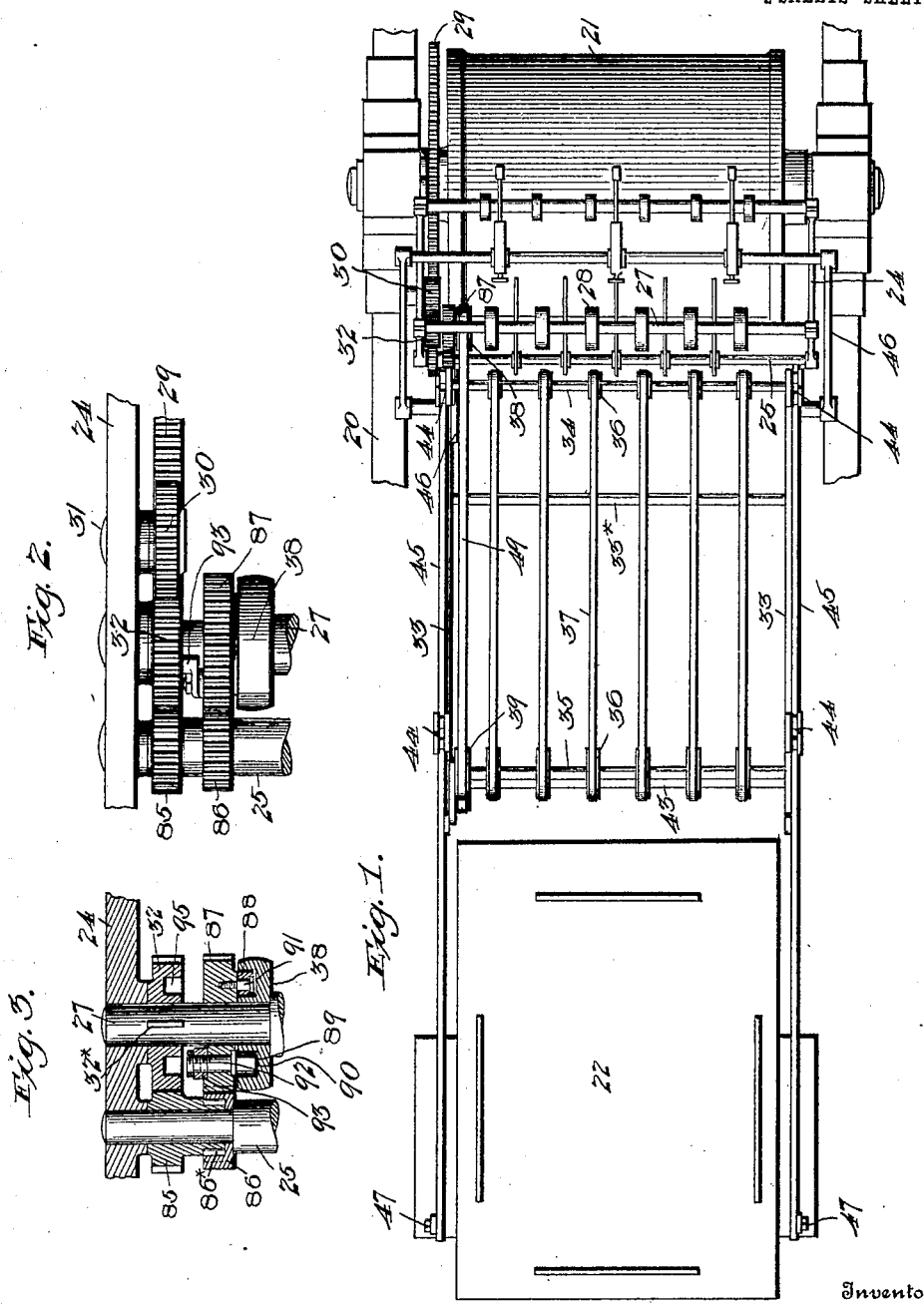

UNITED STATES PATENT OFFICE.

JAMES HUMPHRY, OF ROXBURY, MASSACHUSETTS, ASSIGNOR TO C. B. COTTRELL & SONS COMPANY, OF NEW YORK, N. Y., A CORPORATION OF NEW JERSEY.

BELT-DELIVERY CLUTCH FOR PRINTING-PRESSES.

No. 916,318.     Specification of Letters Patent.    Patented March 23, 1909.

Application filed May 1, 1906. Serial No. 314,703.

*To all whom it may concern:*

Be it known that I, JAMES HUMPHRY, a citizen of the United States, residing at Roxbury, in the county of Suffolk and State of Massachusetts, have invented certain new and useful Improvements in Belt-Delivery Clutches for Printing - Presses; and I do hereby declare the following to be a full, clear, and exact description of the invention, such as will enable others skilled in the art to which it appertains to make and use the same.

My invention relates to printing machines, and especially to the delivery mechanism therefor.

Patent No. 757,248, H. M. Barber, dated April 12, 1904, describes a machine embodying correlated mechanisms for delivering sheets either printed sides downward or printed sides upward. That patent illustrates and describes a structure embodying a reciprocating sheet-carriage, an endless-tape carrier and a fly delivery. The tape carrier takes the sheet from the impression cylinder and carries it forward until the sheet is entirely borne by the tape carrier. Then the sheet may be delivered either by the action of the fly delivery or by the action of the reciprocating sheet-carriage. In the case of the fly delivery the sheet-carriage may remain stationary in its position near the cylinder while the tapes run continuously, their only duty in that case being to receive the sheets from the delivery wheels adjacent the impression cylinder and take them to the proper position over the fly-fingers, which have been thrown back so that they lie beneath the newly fed sheet. In case the carriage delivery is employed the sheet-carriage will be given a to-and-fro motion between the impression cylinder and the outer end of the receiving table. First, however, the carriage will rest at its position near the impression cylinder, while the tapes run forward within, but independently of the carriage, thus lying at rest. Then while the carriage runs forward to its position over the table the tapes will remain stationary within it, and then while the carriage returns toward the cylinder the tapes will again run forward within it, and so carry the sheet out from the tapes to drop upon the table.

In the structure illustrated by this application the fly delivery has been omitted, as the invention relates to the carriage delivery as previously employed in the aforesaid patent.

Briefly, the present invention embodies a device for engaging and securing the driving belt which operates the endless-tape carrier from movement excepting in the sheet-forwarding direction.

In the machine illustrated the tendency of the return movement is to reverse the operation of the belt, which will if not held from traveling in the reverse direction by the belt gripping clutch permit the tape carrier to remain inoperative in the carriage during its return movement, thus carrying the sheet back toward the cylinder. By gripping the bottom section of the belt at the point shown by the drawings this tendency is immediately checked, and the belt causes the tape carrier to run back from under the sheet, leaving it free to drop upon the table.

Figure 5:
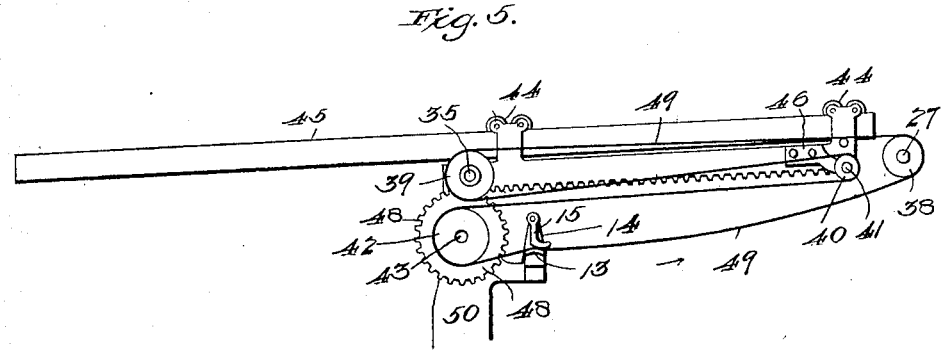
Figure 6:
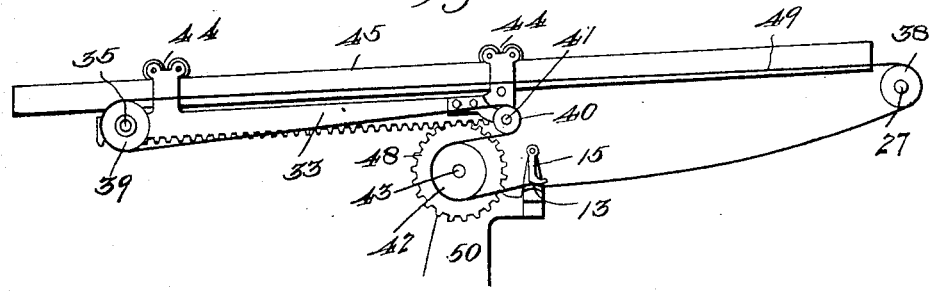

In the accompanying drawings, Figure 1 is a plan view and Figs. 2 and 3 are details of so much of the structure common to this application and the before named patent as will enable the invention herein described to be clearly understood without the necessity of a constant reference to the patent. Fig. 4 is a detail perspective of the belt operating and governing devices; and Figs. 5 and 6 are detail side elevations showing different positions of the sheet-carriage and the belt.

20 represents the frame of the machine, 21 the impression cylinder and 22 the table for receiving the sheets. The usual brackets 24 support a rod or shaft 25 carrying stripping fingers 26 and also carrying the bearings for the two shafts 27 of the usual delivery pulleys 28, the upper of these shafts appearing in the plan view at Fig. 1, and the lower one of the shafts with the associated gearing appearing in Fig. 2. This lower shaft 27 is constantly rotated in the usual way from the gear 29 on the impression cylinder through a gear 30 which turns on a stud 31 carried by one of the brackets 24, the gear 30 meshing with the gear 29 and also with a gear 32 on the lower shaft 27.

The reciprocating sheet carrier comprises parallel side-bars 33 and a connecting crossbar 33*, the side-bars having at each end rollers 44 which travel on stationary ways 45 supported, as illustrated for example, at the points 46 and 47 upon the main frame. The ways 45 have a slight forward inclination from the impression cylinder toward the receiving table. The side-bars 33 of the sheet carriage are racked on the bottom to engage with toothed gears 48 on a horizontal shaft 43 having bearings in stands 50 of the main frame. The sheet carriage contains the usual endless-tape carrier, which, as illustrated, comprises two transverse shafts 34, 35 provided with pulleys 36 upon which run the tapes 37.

The sheet-carriage does not move forward from the impression cylinder to the receiving table until the sheet has been carried forward so that it is borne by the tape-carrier and within the sheet-carriage. While various mechanism may be employed to impart and time the desired reciprocation, the cam and rack mechanism illustrated, described and claimed in the before-named patent No. 757,248 will, of course, be found especially applicable.

To drive the endless-tape carrier 34, 35, 36, 37 within but independently of the reciprocating sheet-carriage I have provided an endless belt 49 which derives motion from a pulley 38 on the lower shaft 27, the belt running over a pulley 39 on the front tape-carrier pulley shaft 35 and thence over an idler pulley 40 turning on a fixed stud 41 on the rear part of the sheet carriage, thence around a forward idler pulley 42, which for purposes of mechanical economy I have represented as carried by the shaft 43, and thence back to the driving pulley 38. In the case of the carriage delivery herein illustrated, in which the sheet-carriage has a to-and-fro motion between the impression cylinder and the receiving table and a rest at the position near the impression cylinder, the tapes run forward within, but independently of, the sheet-carriage, while the latter remains at rest. Then while the sheet-carriage runs forward to its position over the table the tapes remain stationary within it and finally while the sheet-carriage returns toward the impression cylinder the tapes again run forward within it, and carry the sheet out from it so that the sheet is free to drop upon the table. The gearing and clutch mechanism shown in the aforesaid patent to Barber No. 757,248 is employed here as in that patent, the only difference being that I have omitted any means for securing the pulley 38 to the shaft 27, a feature used only with the fly delivery. For convenience the parts of this mechanism and their function may be again stated.

By reference to Figs. 2 and 3 it will be seen that the gear-wheel 32 is keyed fast to the shaft 27 by a key 32*, and meshes with the gear-wheel 85, running loosely on a fixed axle, which, in this instance, is the stripper shaft 25. On the hub of the gear-wheel 85 runs the gear-wheel 86, between which and the gear-wheel 85 is a clutch 86* coupling the gear-wheels 85, 86 so that 85 carries 86 in one direction only. The gear-wheel 86 meshes with the gear-wheel 87, which is loose on the shaft 27. The gear-wheels 32, 87 are of corresponding size, but the gear-wheels 85 and 86 have different numbers of teeth, the gear-wheel 86, in the example shown, having one tooth less than the gear-wheel 85. The gear-wheel 87 carries on its outer face a clutch 88 in the form of an elastic ring with an opening 89 at one point of its periphery. The clutch is received in an annular groove 90 in the inner face of the belt pulley 38. The clutch ring, which is attached to the gear 87 by a screw 91, has normally an external diameter slightly smaller than the outer walls of the groove 90, that it may be sufficiently loose therein to make it inoperative; but for the purpose of expanding it to couple the pulley to the gear 87 there is inserted through the gear 87 a pin 92 which has a flattened head entering the opening 89 of the clutch ring. By the turning of the pin 92 on its axis its head operating within the opening 89 so expands the ring that it fits tightly enough in the groove 90 of the pulley 38 for the gear 87 to drive the latter at the proper times as hereinafter explained. To facilitate the turning of the pin 92 it has securely fixed to it an arm 93 which carries a truck-roller 94 entering the groove of a cam 95 on the outer face of the gear 32, which is keyed to the shaft 27. The pulley 38 thus, as stated, receives its motion for driving the belt 49 from the gear 32 through the gears 85, 86 and clutch 88. This motion takes place only while the carriage is at rest in front of the impression cylinder for receiving the sheet, the clutch 88 then being in operation as hereinbefore described. Just before the sheet-carriage begins its forward movement the clutch 88 liberates the pulley 38, which then ceases to drive the belt. When the sheet-carriage runs forward, as illustrated in Fig. 6, the portion of the belt between the pulleys 42 and 40 runs toward the pulley 39 over pulley 38, which is now free to revolve on the shaft 27 with a tendency to slacken and stop the travel of the tapes, but not to drive them in opposite directions by the pulley 39, because the friction of the carrier in the sheet-carriage is greater than the friction of the pulleys 42 and 38 on their bearings. Therefore as the tapes do not run in the sheet-carriage, but only travel with it, the sheet merely lies upon the tapes until the sheet-carriage completes its outward movement. During the time that the sheet-carriage is returning toward the impression cylinder the clutch 88 still leaves the pulley 38 disengaged. This movement of the sheet-carriage has a tendency to develop a movement of the belt in the opposite direction to that before described. It is the specific purpose of the invention of this application to positively secure the belt against such movement. To this end I have secured to a projection 10 of the frame an angle iron 11 with a projection 12 which bears on its top a curved face or bearing-plate 13. Secured to the opposite side of the projection 10 is an upright 14 to which is pivoted a dog 15 having its biting face turned upon an arc complementary to the bearing face 13 so that while the belt 49 may run freely in the direction of the arrow any pull in the opposite direction will bring the dog 15 into such position as to secure the belt between it and the bearing-plate 13. Under these conditions the pull of the pulley 40 on the intermediate loop of the belt formed between the pulleys 42 and 39 draws the belt tightly against and over the pulley 39, causing that pulley to turn and thus move the tapes forward within the sheet-carriage as the latter runs back toward the impression cylinder. By these movements of the sheet-carriage and the tapes the sheet is run out on the carriage and left free to drop on the delivery table; while the location of the gripping clutch device to the rear of the forward idler-pulley 42 so that the clutch may engage the bottom section of the belt immediately checks any tendency to a backward movement of the belt and prevents carrying the sheets back toward the cylinder with the reverse movement of the carriage.

While in the preceding description the operation has been defined, it will be convenient to briefly review the operation of the belt and endless-tape carrier upon the sheet.

In the operation of the machine a sheet is delivered to the tape-carrier from the impression cylinder and carried over upon the tape carrier until its leading edge is adjacent to the pulleys 39, 42, or until the sheet is borne by the tape-carrier and is within the carriage. This motion is imparted by the pulley 38 to the belt 49, but at the time the sheet reaches the position indicated the clutch 88 is thrown out and the pulley 38 ceases operation. Immediately the gear-wheel 48 rotates and the sheet-carriage moves forward. As the sheet-carriage moves forward it takes with it the pulley 39 and also the idler pulley 40. This movement of the pulleys, as stated, does not turn the tapes, but the whole tape-carrier moves forward with the reciprocating carriage. The belt shifts from the position indicated in Fig. 5 to that indicated in Fig. 6, so that that part of the belt which lies between the pulley 40 and the pulleys 39 and 42 is shifted until it lies almost wholly between the pulley 38 and the pulley 39, the idler pulley 40 at that time being brought close to the pulley 42. The effect upon the tapes is precisely the same as if the belt were secured to the pulley 39 during the forward movement of that pulley with the carrier, or as if the relative positions of the pulleys were changed and the tape then reapplied to conform to these changed positions. With the pulley 39 and the endless-tape carrier and the sheet-carriage at the outward position the sheet is lying upon the tapes immediately over the receiving table. The carriage now begins to return, taking with it the tape carrier. The natural result of such a movement which carries back the pulley 40 and the pulley 39 would be to draw the belt in the opposite direction from that shown by the arrow. This reverse movement of the belt would cause the tapes of the carrier to remain still, hence the sheet would be carried back toward the cylinder and not delivered upon the table. It is the function of the belt clutch device to prevent the backward movement of the belt during the return movement of the carriage. This device will permit the belt to travel in the direction of the arrow but the slightest attempt to move it in the opposite direction will bring down the dog 15 upon the face 13 and prevent any such movement of the belt. As the carriage and tape carrier move back, the reverse movement of the belt being prevented, the result will be that the belt will travel in the direction indicated and will operate the tape carrier so that the tapes can run forward within the carriage, carrying the sheet out from it and leaving the sheet free to drop upon the table. The reverse movement continuing, the parts will be brought again to the original position ready for another operation.

Having fully described my invention, I claim:—

1. In a printing machine, the combination of a reciprocating sheet-carriage, a tape-carrier having opposite shafts and borne by the sheet carriage, a belt for operating the tape-carrier, a series of belt pulleys including a driving pulley, a pulley on the forward shaft of the tape-carrier, an idler pulley in the rear end of the sheet-carriage and a forward idler pulley, with a clutch device located to the rear of the forward pulley and engaging the bottom section of the belt.

2. In a sheet-delivery, the combination of a reciprocating sheet-carriage and a tape-carrier borne by the carriage, delivering the sheet to the carriage and removing it from the carriage, and a belt running in one direction to operate the tapes in the tape-carrier and a brake to prevent the belt from running in the other direction.

In testimony whereof I affix my signature, in presence of two witnesses.

JAMES HUMPHRY.

Witnesses:
   A. R. STILLMAN,
   G. BURDICK.